Figure 1:
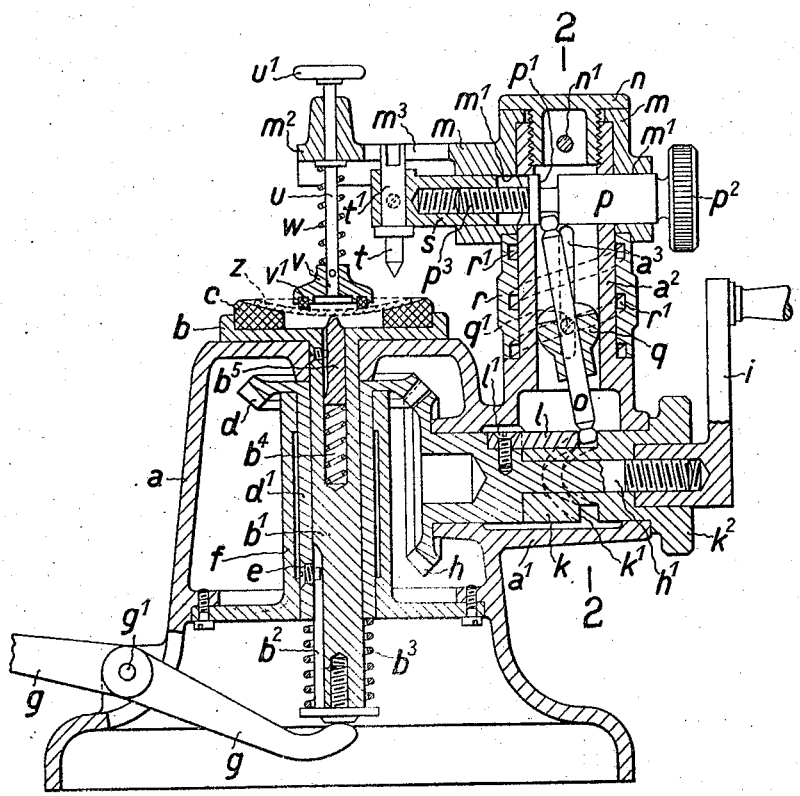

A. STEINLE.
MACHINE FOR CUTTING NONCIRCULAR GLASSES.
APPLICATION FILED AUG. 13, 1921.

1,418,492.

Patented June 6, 1922.

Inventor:
Adolf Steinle

UNITED STATES PATENT OFFICE.

ADOLF STEINLE, OF JENA, GERMANY, ASSIGNOR TO THE FIRM OF CARL ZEISS, OF JENA, GERMANY.

MACHINE FOR CUTTING NONCIRCULAR GLASSES.

1,418,492. Specification of Letters Patent. Patented June 6, 1922.

Application filed August 13, 1921. Serial No. 492,125.

*To all whom it may concern:*

Be it known that I, ADOLF STEINLE, a citizen of the German Empire, residing at Jena, Germany, have invented a new and useful Machine for Cutting Noncircular Glasses (for which I have filed an application in Germany November 21, 1919, and in England, November 3, 1920), of which the following is a specification.

The invention relates to machines for cutting non-circular glasses, especially spectacle glasses, and more particularly to such machines as have a rotatable table, on which the workpiece is fixed, and the cutting tool of which is moved, while cutting, approximately radially to the axis of the table. According to the invention the motion of the cutting tool is produced not directly by a template or similar means providing a guiding curve, but by interposing a two-armed lever having a displaceable centre of rotation. Thus a two-armed lever is caused to engage with a slide, which carries the cutting tool and is adapted to move radially relatively to the axis of the table, which lever plays in a plane containing the axis of the table and the other end of which is guided in a plane or cylindrical guiding curve of a member coupled with the table, the centre of rotation of this two-armed lever being arranged so as to be adjustable in the direction of its longitudinal axis. The total throw of the guiding curve will be so selected that in conjunction with the other dimensions of the machine the greatest required radial difference can be reached. By displacing the centre of rotation of the two-armed lever it is then possible to transmit the path prescribed by the guiding curve of one lever arm to any scale to the end of the second lever arm engaging the tool slide and thus within the range chosen any required radial difference of the glass form to be cut can be set in a simple manner. Preferably the arrangement will be such that the point of rotation of the two-armed lever may be shifted as far as that end of the lever which guides the tool slide. It is thus possible to use the machine conveniently for cutting circular glasses without having to remove the member bearing the guiding curve, as with the point of rotation of the lever in this extreme position for any guiding curve the tool slide will remain stationary during the rotation of the table. The distance of the cutting tool from the axis of rotation of the table will, of course, always be made so as to be variable independent of the curved guide in any known manner, so that the machine may be set to cut a glass any size, whatever its form. It is thus necessary, before using the machine, to make two adjustments, viz on the one hand the required radial difference with the aid of a mark indicating the position of the centre of rotation of the lever and on the other hand the required size of the glass with the aid of a second mark, which indicates the position of the cutting tool relative to its slide. Preferably numbered scales will be used for both adjusting motions, so that, for instance, the glass dimensions resulting for the different scale values can be arranged in the form of a table.

The twofold symmetrical form in general use for spectacle glasses necessitates a twofold symmetrical form for the guiding curve as well. When glasses are to be cut, that are symmetrical only in one direction, the guiding curve must be replaced by one of a corresponding single symmetrical form. Hence the member carrying the guiding curve will preferably be made interchangeable, so that with the same machine glasses may also be cut, having a single symmetrical form, and, when required, glasses having no axis of symmetry at all. The member carrying the guiding curve, which will generally be built into the inner part of the machine, so as to keep it free of dust and the like, will preferably be so formed that the shape of its guiding curve may be shown on an outwardly projecting part of the member.

Figure 2:
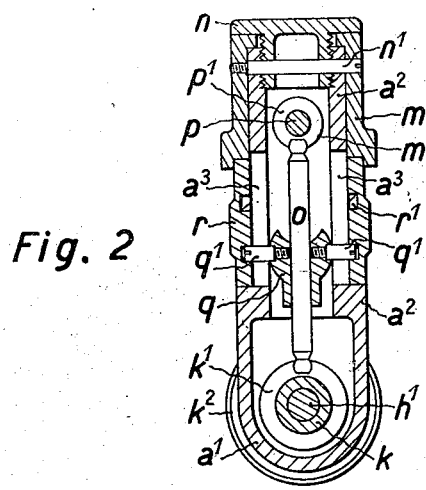

In the drawing a constructional example of the invention is shown, in which the rotatable table is operated from a horizontal axis and the member carrying the guiding curve is mounted on the said axis. Fig. 1 is a longitudinal section through the whole machine and Fig. 2 a section along line 2—2 of Fig. 1. The machine has a casing $a$ of substantially bell-like shape, which on its upper surface and concentric with the axis of the casing carries a rotatable table $b$ with a rubber support $c$ corresponding to the outer surface of the glass $z$ to be cut. The table $b$ forms one piece with its axle $b^1$, which extends into the interior of the casing and onto which and co-axially with it a bevel-wheel $d$ having a long guiding bush $d^1$ is mounted from below. A screw $e$, which is fixed in the bush $d^1$ and engages in a groove $b^2$ of the axle $b^1$, couples the bevel wheel $d$ with the table $b$ so that they rotate together, but allows of an upward movement of the table $b$. The bush $d^1$ of the bevel wheel $d$ is journalled and guided in a bush $f$, which is screwed to the casing $a$. The axle $b^1$ extends somewhat beyond the bush $d^1$ and carries on this part a helical spring $b^3$, which keeps the table pressed onto its supporting surface. Against the bottom end of the axle $b^1$ there rests from below a lever $g$, which is pivotally mounted on the casing $a$ on a pin $g^1$ and is to be imagined as having a handle at its broken end, so that by means of the said handle the table $b$ can be raised slightly in opposition to the action of the spring $b^3$. The axle $b^1$ is further provided at its upper end with a concentric bore $b^4$ into which a spring controlled centering pin $b^5$ is fitted. With the bevel wheel $d$ there meshes a second, horizontally mounted bevel wheel $h$ of the same size, which is journalled in a laterally projecting part $a^1$ of the casing $a$ and is integral with its axle $h^1$. The front part of the axle $h^1$ is stepped down and has slid onto it on this part from without a cylindrical bush $k$, into which a winding guiding groove $k^1$ is cut. Onto the end of the axle $h^1$ a cranked handle $i$ is screwed, which serves for operating the machine and for fixing the bush $k$. The bush $k$ has a flange $k^2$ extending beyond the projecting part $a^1$ of the casing, by means of which it can easily be removed after the crank $i$ has been taken off. In order to prevent the bush $k$ turning relatively to the axle $h^1$, a spring $l$ is fixed to the thicker part of the axle $h^1$ by means of a screw $l^1$, which spring engages in a corresponding groove of the bush $k$. The projecting part $a^1$ of the casing bears a further, upwardly directed, cylindrical extension $a^2$, on which at its upper end a transverse part $m$ is mounted. This transverse part $m$ is fixed by means of a terminal part $n$, screwed into the extension $a^2$, and a pin $n^1$ passing through the parts $m$, $a^2$ and $n$. Within the cylindrical extension $a^2$ there is a cylindrical pin $o$, which serves as a lever and has spherical knobs at either end. The lower knob, engages in the guiding groove $k^1$ while the upper one extends into an annular groove $p^1$ of a horizontally displaceable bolt $p$. The lever $o$ is mounted in a spherically shaped part $q$, which is itself supported by two pins $q^1$, which are guided in vertical slots $a^3$ in the projecting part $a^2$ of the casing. The two pins $q^1$, which form the axis of rotation of the lever $o$, further engage each in a steep thread $r^1$ of a sleeve $r$, which surrounds the cylindrical extension $a^2$ and is prevented from being displaced in the axial direction by the transverse part $m$, so that by turning the sleeve $r$ the two pins $q^1$ with the lever bearing $q$ may be displaced in the vertical direction. The bolt $p$ is guided in a bore $m^1$ passing through the transverse part $m$ radially to the table axle $b^1$ and has at its outer end a milled head $p^2$ and at its other end a screw $p^3$, which screws into a cylindrical guiding piece $s$, which slides in the bore $m^1$. This guiding piece $s$ carries at its outer end the cutting tool $t$, the holder $t^1$ of which extends into a slot $m^3$, which is parallel to the bore $m^1$, of an arm $m^2$ connected to the transverse part $m$, so that the guiding piece $s$ is secured against turning. Finally the arm $m^2$ supports concentric with the axle $b^1$ of the table a pin $u$ provided with a head $u^1$, to the bottom end of which a small pressure plate $v$ is fixed. The pressure plate $v$ bears on its under side a rubber ring $v^1$ and is pressed by a spring $w$ wound round the pin $u$ onto the glass $z$ to be cut, which is thus clamped.

The machine is operated in the following manner. After the glass $z$, which is to be cut has been placed on the table and has been centred by means of the centring point $b^5$, in the first place by turning the sleeve $r$ the required axial ratio is set for and by turning the milled head $p^2$ the size of the glass required. Thereupon by pressing one hand on the lever $g$ the table along with the glass $z$ to be cut is raised, until the tool $t$ comes in contact with the glass $z$, and with the other hand the crank $i$ is given a complete revolution. In consequence of the bevel wheel transmission $h$, $d$ the table along with the glass $z$ is thereby rotated once about its axis and at the same time by means of the curved groove $k^1$ and the lever $o$ the part $p$ and with it the carrier $s$ of the cutting tool is moved in the requisite manner, so that the cutting tool cuts out the required shape on the glass $z$.

I claim:

In a machine for cutting non-circular glasses a rotatable table, a cutting tool, a slide carrying the said tool, a two-armed lever playing in a plane containing the axis of the table, a member coupled with the said table and having a guiding groove, one end of the said lever coacting with the said slide whilst the other end coacts with the said guiding groove, and means for adjusting the point of rotation of the said lever in the direction of its longitudinal axis.

ADOLF STEINLE.

Witnesses:
PAUL KRUGER,
RICHARD HAHN.